United States Patent [19]

Parker

[11] Patent Number: 4,701,512

[45] Date of Patent: Oct. 20, 1987

[54] ISOCYANATE ADDUCTS WITH BENZOXAZOLONES OR BENZOXAZINEDIONES AND USE THEREOF AS LATENT CHAIN EXTENDERS OR CROSS-LINKERS FOR EPOXIDES

[75] Inventor: Theodore L. Parker, Lafayette, Calif.

[73] Assignee: The Dow Chemical Company, Midland, Mich.

[21] Appl. No.: 792,384

[22] Filed: Oct. 29, 1985

[51] Int. Cl.$^4$ ............................................. C08G 71/04
[52] U.S. Cl. ..................................... 528/45; 528/73; 528/96; 528/117; 544/50; 544/73; 544/94; 548/157; 548/171; 548/219; 548/221
[58] Field of Search ............... 548/157, 171, 219, 221; 544/50, 73, 94; 528/45, 117, 73, 96

[56] References Cited

U.S. PATENT DOCUMENTS

| | | | |
|---|---|---|---|
| 3,256,293 | 6/1966 | Baker et al. | 548/221 |
| 3,415,901 | 12/1968 | Schramm et al. | 528/96 X |
| 3,789,053 | 1/1974 | Clarke | 528/96 |
| 4,350,781 | 9/1982 | Rasshofer et al. | 525/504 X |
| 4,355,058 | 10/1982 | Gras et al. | 528/45 X |

*Primary Examiner*—Earl Nielsen
*Attorney, Agent, or Firm*—Robert R. Stringham

[57] ABSTRACT

The adducts of isocyanates wtih benzoxazolones or benzoxazinediones are novel compounds which may be employed as blocked isocyanates and are particularly useful as latent, epoxide curing agents. At typical epoxide curing temperatures, the isocyanate is oxirane or hydroxyl reactive and the benzoxazole or benzoxazinedione acts like a di- or trifunctional phenol, respectively.

26 Claims, No Drawings

ISOCYANATE ADDUCTS WITH BENZOXAZOLONES OR BENZOXAZINEDIONES AND USE THEREOF AS LATENT CHAIN EXTENDERS OR CROSS-LINKERS FOR EPOXIDES

RELATED APPLICATIONS

A co-pending application of the present inventor, Ser. No. 745,178, filed June 17, 1985, is directed to N-glycidyl derivatives of benzoxazolones nd benzothiazolones. Two or more molecules of the glycidyl compounds may react with a polyfunctional active hydrogen compound to form polyadducts which can be caused to rearrange to polyfunctional phenols which are cross-linkers for epoxies. Thus, the latter adducts may be employed as latent curing agents for epoxy resins.

Another co-pending application of the present inventor, Ser. No. 763,866, filed Aug. 9, 1985, now U.S. Pat. No. 4,631,331, is directed to the use, as latent cross-linkers for epoxies, of adducts of benzoxazoles (etc.) with polyfunctional epoxides, the adducts being thermally rearrangeable to polyfunctional phenols.

BACKGROUND OF THE INVENTION

Aromatic polyisocyanates have been employed, indirectly, as cross-linkers for polyepoxides. (See U.S. Pat. No. 3,687,897.) The resulting cross-links comprise oxazolone moieties which are theoretically derivable by direct oxirane/isocyanate adduction but cannot in fact be readily so formed, even in the presence of epoxide curing catalysts. However, when the isocyanate is adducted with an alcohol, the resulting carbamate will react, at temperatures of 130°–155° C. and in the presence of certain phosphonium catalysts, with oxiranes, to split out the alcohol and form oxazolidinone ("oxazolone") groups. That is, the reaction of alcohol "blocked" NCO groups with oxirane groups can be catalyzed at temperatures below those (180° C., for example) at which such blocked isocyanates, per se, deblock.

However, the foregoing use of blocked isocyanates poses the problem of what to do with the liberated alcohol (meOH, typically). Such alcohols are monofunctional (otherwise polymerization with the isocyanate is likely) and cannot function as cross-linkers. Consequently, the agent must be removed or, at best, functions as a reactive diluent or a generally unwanted plasticizer.

Another problem with the foregoing use of blocked aromatic isocyanates is that of premature "deblocking", which results in gelling at temperatures high enough to effectively reduce epoxy resin viscosities. That is, the carbamate reacts at lower temperatures than is desirable; the epoxy/blocked isocyanate system is not adequately latent for some important applications.

Carbamate groups formed from aliphatic isocyanates are less oxirane-reactive, so much so, in fact, as to be excessively latent. Also, the problem of the liberated alcohol would not be avoided.

For purposes other than epoxide modification or curing, polyisocyanates are commonly blocked with not only alcohols but other —OH or =NH functional compounds, such as phenols, oximes and lactams. Phenols are oxirane reactive but phenol/isocyanate adducts deblock at even lower temperatures than the alcohol adducts. The other conventional types of blocking agents are not adequately reactive with oxirane groups and must be removed or left as an adulterant in the cured product.

Thus, a blocking agent which will not polymerize with the polyisocyanate, does not dissociate from it prematurely and can be transformed at curing temperatures into an epoxide cross-linker—though highly desirable—is not contemplated in the prior art.

OBJECTS OF THE INVENTION

The primary object of the invention is to identify a type of blocking agent which has the latter characteristics.

A corollary object is to provide specific blocking agents of the aforesaid type.

A particular object is to provide a blocking agent of the foregoing type which is monofunctional in its reaction with isocyanates but, when dissociated from them, can—in effect—function as an at least difunctional phenol.

An important object is to provide a blocking agent of the foregoing type which can be reacted with a polyisocyanate in the presence of an epoxide subsequently to be cured by the isocyanate and the blocking agent.

Another object is to provide a blocked isocyanate/epoxy system of the foregoing type which includes a curing catalyst but has good shelf and pot lives.

A particular object is to provide a new type of blocked isocyanate having utility as latent sources of oxirane-reactive di- or triphenols (and as a source of oxirane- and/or hydroxyl-reactive isocyanates).

A further object is to provide blocked polyisocyanates of said novel type in which the isocyanate functions largely as an alcoholic hydroxyl-reactive cross-linker and the blocking agent acts largely as an oxirane-reactive cross-linker.

Still other objects will be made apparent to those knowledgeable in the art by the following specifications and claims.

SUMMARY OF THE INVENTION

It has been discovered that the foregoing objects can be attained by employing, as latent chain-extenders or curing agents for epoxides, the novel "blocked isocyanates" which comprise oxirane reactive —N—H—CO—N groups and are compounds of the following formula:

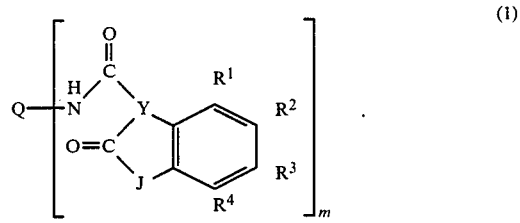

(1)

wherein Q is a mono- or polyvalent, non-interfering radical; independently in each occurrence, Y is an >N— or

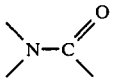

group, J is 0 or S, $R^1$, $R^2$, $R^3$ and $R^4$, independently, are H or a non-interfering substitutent of which any adjacent pair may constitute an alkylene, alkenylene or alkadienylene group of 3 or 4 carbons, and m is an integer having a value of at least 1 (but preferably not greater than 3).

In a process aspect, the present invention is the process of forming an adduct of the foregoing formula (1) by reacting an isocyanate of the formula Q$(-$NCO$)_m$ (2) with m molecular proportions of a benzo-N-heterocycle of the formula:

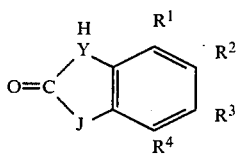

(3)

wherein J, Y and $R^1$, $R^2$, $R^3$ and $R^4$ are as above defined. Preferably, Y is N- and/or J is 0. The adduct preferably is formed in the presence of an epoxy resin and preferably is insoluble in the resin at temperatures substantially below that at which the onset of curing occurs, thereby affording a physical latency (in addition to the chemical latency of the blocked isocyanate).

Also within the ambit of the invention are latent mono- or polyphase epoxy resin systems comprising:

(a) a polyfunctional epoxide; and
(b) dispersed throughout the rest of said system or constituting a continuous separate phase dispersible therein, a blocked isocyanate of the foregoing formula (1), in which m is preferably 2.

Optionally, an excess of the free blocking agent can be present as well. That is, from 1 to about 1.1 molecules of blocking agent per isocyanate group may be employed in forming the blocked isocyanate. Preferably, the blocking agent is a benzoxazolone and the ratio is within the range of from about 1.02 to about 1.05.

In a narrower aspect, the process of the invention includes heating a resin system of the latter type to a temperature such that the epoxide component and the blocked isocyanate interact to effect chain-extension and/or cross-linking of the epoxide.

Without making any representations as to mechanisms, formation of oxazolone groups or carbamate groups requires only interaction of the blocked isocyanate with an oxirane or alcoholic OH group (and liberation of the blocking agent). However, formation of ether groups requires a series of at least three reactions: adduction of the liberated blocking agent with an oxirane in an epoxide molecule, rearrangement of the adduct to a phenolic-hydroxyl-containing compound and involvement of the phenolic hydroxyl and an oxirane in another epoxide molecule in one of the types of reactions which occur when epoxides are reacted with phenols (such as phenol/oxirane adduction or phenol-assisted reactions of alcoholic hydroxyls with oxiranes).

Terminology

The term, "non-interfering" as used herein, means a radical or substituent which does not interfere to an intolerable extent with any of the reactions involved in the practice of the invention.

The blocked isocyanate may be "dispersed" in the epoxy as a powdered second phase or as a solute in the epoxide (or in a solution of the epoxide in a removable solvent, as a distinctly less preferred option).

By the term epoxy resin system is meant an epoxy resin or mixture of epoxy resins, as such or in combination with one or more solvents, reactive diluents and/or other such additives as are customarily included in epoxy resin formulations.

DETAILED DESCRIPTION

When a blocking agent of formula (3) in which Y is NH reacts with an oxirane group, a moiety of the formula

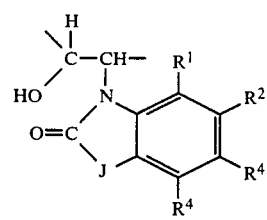

(4)

is formed and can be caused to rearrange to a phenolic moiety of the formula

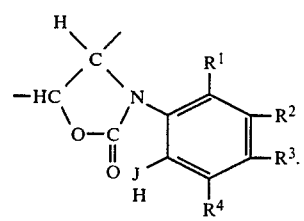

(5)

When Y in formula (3) is NH—CO—, the blocking agent is a 1,3-benzoxazine-2,4-dione

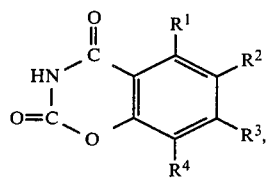

(6)

one molecule of which can react out a total of three oxirane groups. It has not been unequivocally established that the structure of the reaction product with the first oxirane is of the general type illustrated by the preceding formula (4) but it is reasonable to postulate such a structure as at least a transient intermediate. However, an "abnormal" rearrangement (prior to reaction with a second oxirane) to an intermediate of a structure such as, for example,

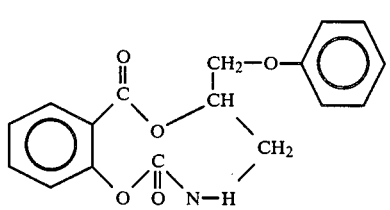

(7)

which contains a less, but sufficently-reactive —NH group, is apparently required. Whatever the correct structure, the initial adduct has a latent functionality of two for each benzoxazinedione molecule incorporated therein. The reaction of the regenerated NH group with a second oxirane produces a stable species which apparently contains a —CH₂—CHOH— group and will rearrange in the "normal" manner to produce an oxirane-reactive phenol such as

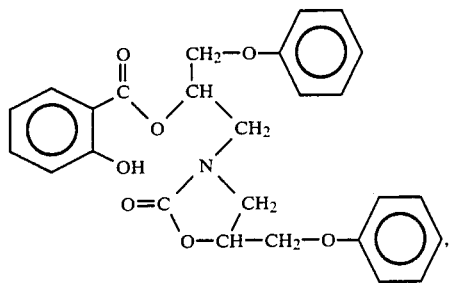

for example, which can react with a third oxirane.

On the basis of a limited amount of data, it appears highly preferable to employ an aliphatic polyisocyanate when a benzoxazinedione is to be the blocking agent.

If each of two or more oxiranes in the same epoxide molecule adducts with a molecule of formula (3), the resulting polyadduct is a polyphenol, i.e., a chain-extender or cross-linker for polyfunctional epoxides. (Such adducts are claimed in Ser. No. 763,866, loc cit.) Preferably, such polyadducts are 2:1 adducts.

If a molecule of formula (3) adducts with the sole oxirane in a monofunctional epoxide species comprised in an epoxy resin, the resulting 1:1 adduct becomes a reactive diluent (and also is a homopolymerizable monomer).

The blocked isocyanate of formula (1) preferably is formed in situ, i.e., in the presence of the epoxide to be extended or cured. However, it is feasible to prepare it ex situ, i.e., in the absence of epoxides. In the latter case, a reaction medium which is a solvent for the isocyanate and the blocking agent (of formula (3)), but is a non-solvent for the blocked isocyanate, is preferred. This is not to say that the epoxide could not also be dissolved in a solution of the blocked isocyanate (assuming the solvent could be removed economically before or during curing) but the physical latency which results from a two-phase system would thereby be given up. Preferably, the solvent employed is one from which the blocked isocyanate can be made to precipitate as a powder which can readily be mixed with a separate (liquid or particulate) body of the epoxide.

Because cross-linking of polyepoxides is generally of considerably greater interest than chain-extension, the discussion henceforth will be largely limited to the use of polyisocyanates. Those knowledgeable in the art are well able to apply the principles involved to the preparation and use of blocked mono-isocyanates. It may be noted, however, that chain extension can be accomplished with either the blocked mono-isocyanates or with a minor excess of the free blocking agent.

Suitable Epoxides

Essentially any type of epoxide comprising at least enough polyfunctional molecules—free of interfering substituents—to have an effective average functionlity greater than 1, is deemed suitable for the practice of the present invention. Such types include monomeric, oligomeric and polymeric epoxides and may be saturated or unsaturated, aliphatic, cycloaliphatic, aromatic or heterocyclic. They may be O- or N-glycidyl derivatives, olefin oxides, glycidyl ethers or esters, epoxy novolacs, hydantoin epoxides, oxirane-terminated polyalkylene oxides, etc. Suitable glycidyl compounds include those in which the glycidyl moiety is of the formula

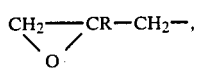 (7)

wherein R is any non-interfering substituent but preferably is H or CH₃.

If the epoxide is a liquid, it will be more easily processed. Preferably, it is a liquid (at ordinary or somewhat elevated temperatures) in which the blocked isocyanate can form and be dispersed as a powdered solid.

Mixtures of epoxides of the same and/or different types may be employed and are often lower melting or otherwise advantageous.

The epoxide selected will generally be of sufficient molecular weight to have respectable physical properties, i.e., will generally be an epoxy resin. Most widely used among such epoxides are two-stage reaction products of epichlorohydrin with the dinuclear "bisphenols", most notably bisphenol A, the reactions being carried out under conditions conducive to chain growth. The resulting glycidyl-terminated, polyhydroxy, polyethers generally have oxirane functionalities of from about 1.5–2 and may be represented by the following idealized formula:

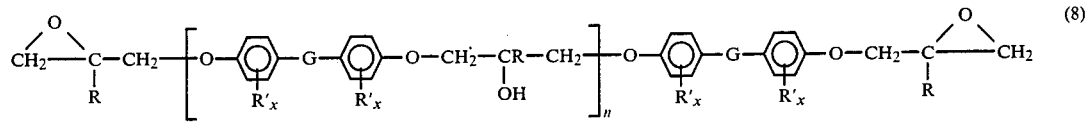 (8)

wherein, independently in each occurrence, G is a valence bond, an alkylene or alkenylene group—optionally halosubstituted, CO, O, S, S—S, SO, SO₂, SiO, etc., R is H or a non-interfering substituent, R' is a non-interfering substituent, x is 0, 1 or 2 and n is an integer having a value of from about 0 to about 90. A typical commercial epoxide of this type is D.E.R. ®-667 (Dow Epoxy Resin-667; registered trademark of The Dow Chemical Company) which has an equivalent weight of about 1600–2000, n being 10–13 and R being H. This epoxide is neither a liquid or low melting but can be used in admixture with a liquid epoxide (D.E.R.-332, for example; n=∼0.15).

It will be noted that when n, in the latter formula, is not zero, some alcoholic hydroxyls will be present in the epoxide. Also, partially hydrolyzed epoxides include hydroxyl groups (primary and secondary). Alcoholic hydroxyls of course are reactive with NCO groups. This is dealt with in the section herein on polyisocyanates.

Epoxy novolacs are another commercially important type of higher molecular weight epoxides; these generally have oxirane functionalities of from about 3 to 7 or higher. They also prepared in two main stages: a phenol is condensed with a ketone or aldehyde—formaldehyde, most notably—to produce a linear chain of hydroxyphenyl groups alternating with intervening alkylene links and then the phenolic hydroxyls are converted (in two steps) to glycidyl ether groups with epichlorohydrin. A typical commercial epoxy novolac is D.E.N. ®-438; mol wt. ~630, eq. wt. ~180 (Dow epoxy Novolac 438, a registered trademark of The Dow Chemical Company).

Branched epoxy novolacs are glycidyl ethers of poly(hydroxyphenyl)alkanes, such as 1,1,2,2-tetrakis(p-hydroxyphenyl)ethane, for example. Particularly good combinations of physical properties are possessed by the triglycidyl ethers of "tris-phenols" in which all three hydroxyphenyl groups are attached to the same end-carbon in a $C_1$–$C_{11}$ alkane (or alkene); also, higher functionality, oligomeric versions of these epoxides are readily made and have excellent properties (see U.S. Pat. No. 4,394,496, assigned to Dow). Branched epoxy novolacs having oxirane functionalities of from 5 to 10 or more are preparable by the "epoxidation" of novolacs made by the reaction of mono- or dihydric phenols with mono- or dinuclear diphenols ring-substituted with three or four methyol or alkoxymethyl groups (see U.S. Pat. No. 4,474,929, also assigned to Dow). Such higher functionality epoxides are more likely to gel prematurely and are accordingly less preferred.

Suitable Isocyanates

Essentially any type of mono- or, preferably, polyisocyanate, which does not include excessive proportions of molecules including interfering radicals or substituents, may be employed in the practice of the present invention. Preferably, the isocyanate is soluble in the epoxide, at least with the aid of a subsequently removable co-solvent. It is also preferred that polyisocyanates employed have an average functionality of from about 2 to about 3.

A wide variety of polyisocyanates have been disclosed in numerous U.S. patents directed to polyurethane compositions and are considered representative of those suitable for the present invention. These polyisocyanates are largely diisocyanates and include aromatic, aliphatic, aralkyl, heteroaliphatic, alicyclic and heterocyclic species. Suitable such polyisocyanates are saturated or unsaturated and monomeric or oligomeric—including 2:1 adducts of monomeric diisocyanates and di- or polyglycols. Choice of polyisocyanate has not been found to be a critical factor in the practice of the present invention but the following specific isocyanates are listed as being illustrative: toluene-2,4-diisocyanate; 1,5- and 1,8-naphthalenediisocyanates; cumene-2,4-diisocyanate; 4-methoxy-1,3-phenylenediisocyanate; 4-chloro-1,3-phenylenediisocyanate; 4-bromo-1,3-phenylenediisocyanate; 4-ethoxy-1,3-phenylenediisocyanate; 2,4'-diisocyanatodiphenylether; 5,6-dimethyl-1,3-phenylenediisocyanate; 2,4-dimethyl-1,3-phenylenediisocyanate; 4,4'-diisocyanatodiphenylether; benzidinediisocyanate; hexamethylene diisocyanate; 4,6-dimethyl-1,3-phenylenediisocyanate; 9,10-anthracenediisocyanate; 4,4'-diisocyanatodibenzyl; 3,3'-dimethyl-4,4'-diisocyanatodiphenylmethane; 2,6'-dimethyl-4,4'-diisocyanatodipheny; 2,4-diisocyanatostilbene; 3,3'-dimethyl-4,4'-diisocyanatodipheny; 3,3'-dimethoxy-4,4'-diisocyanatodiphenyl; 1,4-anthracenediisocyanate; 2,5-fluorene-diisocyanate; 2,6-diisocyanatobenzfuran; 2,4,6-toluenetriisocyanate; 2,4,4'-triisocyanatodiphenylether and di(sulfonylisocyanates).

Other organic polyisocyanates are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Also suitable are isocyanate-terminated polyalkylene oxides and oligomeric prepolymers.

When polyisocyanates having a functionality above about 2 are employed, they preferably are employed in small quantities in admixture with a diisocyanate.

Though finding little utility in polymers, many monoisocyanates are known. Also, conversion of amines to isocyanates, by phosgenation, is a reaction of wide applicability.

If an isocyanate group is attached directly to an aromatic (or heteroaromatic) ring, it will readily react with either the intended blocking agent or with a hydroxyl group present in the resin. The product of either reaction will also readily react with an oxirane to form an oxazolone moiety and liberate the blocking agent or hydroxyl. If the isocyanate group is non-aromatic, it will react with either the blocking agent or a hydroxyl, although less readily. In this case, the product of either reaction will be substantially less reactive with oxirane groups, particularly when it is a carbamate, i.e., is derived from an alcoholic hydroxyl. In the latter case, the isocyanate group is not readily regenerated and is essentially unavailable for reaction with an oxirane group.

Thus, when hydroxyl groups are present, enough of the isocyanate groups present in the polyisocyanate can be non-aromatic to irreversibly react out the hydroxyls and if, in addition to the blocking agent, more isocyanate is required for oxirane conversion, this can be provided as aromatic NCO groups.

Stoichiometry

The minimum total equivalents of isocyanate and latent phenolic hydroxyl theoretically required to effect a satisfactory cure will depend on the equivalents of oxirane and alcoholic hydroxyl present in the epoxy as charge to the system, the relative proportions of the isocyanate groups which are aliphatic and aromatic and on whether or not a catalyst (for oxirane/NCO and oxirane/phenolic OH reactions) is employed.

Catalytic Cures

The simplest relationships between the relative amounts of oxirane, alcoholic hydroxyl, isocyanate and blocking agent result when a catalyst is employed. In this situation, the reaction between oxiranes and alcoholic hydroxyls (originally present or generated by phenolic OH/oxirane adduction) is so much slower than the other oxirane consuming reactions that, for practical purposes, it can be ignored. Assuming no excess of NCO, those isocyanate groups which are aromatic will report in the cured resin only in the form of oxirane/NCO adducts, i.e., as oxazolidinone groups and those isocyanate groups which are non-aromatic will report only in the form of adducts with alcoholic hydroxyls (carbamates).

Thus, assuming complete oxirane conversion, the following relationships hold when catalyst is used.

Assigning the following meanings to the symbols $O_x$, P, I, n and $f_a$:

$O_x$ total equivalents of oxirane to be converted.
P equivalents of phenolic hydroxyl required.
I equivalents of isocyanate required.
n P/I (=2 or 3).
$f_a$ the fraction of the isocyanate groups which are aromatic; the fraction of non-aromatic isocyanate is then $1-f_a$; thus $P=O_x-If_a=nI$ and $O_x=I(n+F_a)$ or, when a catalyst is used, $$I=O_x/(f_a+n) \qquad \text{(Eq. 1)}$$

An alcoholic hydroxyl is formed for each phenolic OH adducted with an oxirane. That is, the equivalents of alcoholic hydroxyl formed is equal to P. But P=nI and n is at least 2, so more than enough alcoholic hydroxyl will be generated to react out all of the non-aromatic isocyanate, even when $f_a$=zero ($I=O_x/n$), with no dependence on alcoholic hydroxyl orginally present in the epoxide. When $f_a=1$, $I=O_x(1+n)$.

Non-catalystic Cures

If a catalyst is not used, oxirane groups will be converted by both phenolic and alcoholic hydroxyl groups (as well as by aromatic NCO groups). In that event, the relative proportions of oxiranes converted (etherified) by each of the two kinds of hydroxyl will depend on whether or not alcoholic hydroxyls are present in the epoxide as charged. That is, according to Lee and Neville, *Handbook of Epoxy Resins*, McGraw-Hill, N.Y., N.Y., 1967; pp. 5–16, 17, when epoxides are cured (16 hours at 200° C.) with phenols in the absence of bases (and other catalysts) and alcoholic hydroxyls are not present to start with, for each equivalent of oxirane converted about 0.6 equivalents of phenolic OH are required. The other 0.4 equivalents of oxirane are converted by alcoholic hydroxyls generated in the phenol-/oxirane reaction).

If alcoholic hydroxyls are present to start with, then for each equivalent of oxirane converted, only about 0.35 equivalents of phenolic OH are required; the other 0.65 equivalent of oxirane is converted by alcoholic hydroxyls (orginally present or generated).

Thus, if no alcoholic hydroxyl is initially present, $$P=0.6(O_x-I \cdot f_a)=nI=0.6O_x-0.6If_a$$

so $$I(n+0.6F_a)=0.6O_x$$

$$\text{or } I = 0.60_x/(n + 0.6f_a) \qquad \text{Eq. 2}$$

No alcoholic OH initially present and the equivalents of non-aromatic isocyanate to be reacted out by alcoholic hydroxyls will be $I(1-f_a)$.

When $f_a=0$ (all isocyanate non-aromatic), the hydroxyl requirement is maximal and equal to I. The supply of hydroxyls will be one equivalent for each equivalent of oxirane reacted with phenolic hydroxyls, i.e., will be equal to $P=0.6(O_x\_0)=0.6O_x$. But P=nI, or at least 2I—which is double the maximum requirement to react out non-aromatic isocyanate. (Of course, when $f_a=1$, no isocyanate has to be reacted out by hydroxyls.)

If alcoholic hydroxyl is initially present, $$P=0.35(O_x-I \cdot f_a)=nI=0.35O_x-0.35If_a$$

so $$I(n+0.35f_a)=0.35O_x$$

$$\text{or } I = 0.350_x/(n + 0.35f_a) \qquad \text{Eq. 3}$$

Alcoholic OH initially present and, again, the ratio of available alcoholic hydroxyl (at least 2I) to the maximal requirement for alcoholic hydroxyl (I) is at least 2:1.

Thus, equations (1)–(3) cover all of the combinations of circumstances discussed above.

TABLE 1
EQUATIONS FOR TOTAL EQUIVALENTS OF ISOCYANATE REQUIRED SO THAT BLOCKING AGENT WILL PROVIDE THEORETICAL REQUIREMENT OF PHENOLIC HYDROXYLS FOR COMPLETE OXIRANE CONVERSION

| Alcoholic Hydroxyls Initially Available | Catalytic or Non-catalytic Cure | Equation | No. |
|---|---|---|---|
| Yes/No | Catalytic | $I = O_x/(n + f_a)$ | (1) |
| No | Non-catalytic | $I = 0.60_x/(n + 0.6f_a)$ | (2) |
| Yes | Non-catalytic | $I = 0.350_x/(n + 0.35f_a)$ | (3) |

NOTES:
(1) n is 2 if blocking agent is a benzoxazolone; n is 3 if blocking agent is a benzoxazinedione.
(2) $f_a$ is fraction of isocyanate groups which are aromatic.
(3) $O_x$ = total equivalents of oxirane.
(4) I = total equivalents of —NCO.

When a more linear, less highly cross-linked, cured polymer is desired, a difunctional blocking agent is used, in an amount somewhat greater than the minimum stoichiometric amount. (See Examples 3C and 3D herein.) If the isocyanate employed is non-aromatic, an equivalent of isocyanate for each equivalent of (latent) phenolic hydroxyl may still be employed—provided enough alcoholic hydroxyl to react out the excess isocyanate can be provided in the form of hydroxyl compounds (a diol, for example) which will not result in cross-links derived from polyisocyanate molecules. The excess of the blocking agent will consume oxiranes (in the course of chain extension) which could otherwise be involved in formation of cross-links from epoxide molecules themselves. (See Example 4D herein.)

If the excess blocking agent molecules are not associated with isocyanate groups, they will tend to react directly with the epoxide at temperatures below the "deblocking" temperature, but so long as the blocking agent is only difunctional this will not matter. That is, some chain extension will occur before, rather than simultaneously with, cross-linking. In general, however, the excess of blocking agent should be minor, i.e., not greater than about 20% of the minimum stoichiometric requirement.

It may be noted that the diol referrd to above may be a polyglycol. If used in appropriate amounts relative to the isocyanate molecules to be converted, this will result in inclusion of a minor amount of a typical, urethane oligomer in the cured system (assuring adequate catalysis is provided by that system).

Blocking Agents

Suitable blocking agents for the practice of the present invention are the benzo-N-heterocycles of formula (3).

The benzoxazolone compounds of formula (3) which are not available per se can be prepared from the corresponding mono- or difunctional phenols (or thio phenols), ring substituted ortho to the —OH or —SH groups by —NH$_2$ groups. The o-amino phenols are reacted in a known manner with phosgene or trichloromethyl chloroformate ("diphosgene" or "liquid phosgene" -sold by Alfa Products (Morton-Thiokol, Inc.)). The ortho amino phenols themselves are made by well known procedures-most notably, by reduction of the corresponding o-nitrophenols.

Known benzoxazolones (etc.) include 2-(3H)-benzoxazolone, 2-(3H)-benzothiazolone, 5- and 6-chloro-2-(3H)-benzoxazolones and 7-methoxy-2-(3H)-benzoxazolone.

Known o-aminophenols include 2-amino-3-chlorophenol, 2-amino-4-chloro-5-nitrophenol, 2-amino-6-chloro-4-nitrophenol, 2-amino-4,6-dibromophenol, 2-amino-3,5-dichlorphenol, 4,6-diamino-resorcinol, 2,3-diaminoquinol, 2,5-diaminoquinol, 1-amino-2-naphthol, and 3-amino-2-naphthol.

Known mono- and disubstituted benzoxazinediones (see Effenberger et al; Chem. Ber. 1972, 105, p. 1933), are those of formula 6 in which $R_2$ and $R_4$ are H and $R^1$ and $R^3$ are as follows:

| $R^1$ | $R^3$ |
|---|---|
| H | CH$_3$ |
| H | OCH$_3$ |
| H | Cl |
| CH$_3$ | CH$_3$ |
| OCH$_3$ | OCH$_3$ |

Other benzoxazinediones of formula (3) can be made by reaction of the corresponding o-hydroxy carboxamides with phosgene, "liquid phosgene" or a lower alkyl chlorofomate. Such o-hydroxy amides are preparable by standard methods from the corresponding o-hydroxy carboxylic acids, of which the following known acids are representative: 2-hydroxy-1-naphthoic acid, 1-hydroxy- and 3-hydroxy-2-naphthoic acids and 5,6,7,8-tetrahydro-3-hydroxy-2-naphthoic acid.

Blocking, Deblocking and Curing Temperatures

The blocking reagents of the invention will react directly with oxiranes at temperatures of about 150° and up. However, only moderately elevated temperatures and required to effect the reaction of isocyanates with the blocking agents employed and in situ blocking is feasible. Thus, temperatures in the vicinity of about 60°-85° C. generally result in a satisfactory reaction rate. (The latter range encompasses the boiling points of tetrahydrofuran and methyl ethyl ketone, convenient solvents for ex situ preparation of the blocked isocyanates.) Fortunately, even temperatures sufficiently elevated (100°-130° C., for example) to effect epoxide melting or viscosity reduction are suitable and may be preferred for in situ blocking reactions. Since the blocking reaction may be exothermic, care should be taken not to reach the more elevated temperatures too rapidly, or one of the reactants should be added incrementally.

The lowest temperatures at which "deblocking" can be affected are generally somewhat below those (180° and up) employed for curing the epoxide systems. However, they are sufficiently elevated so that the initial blocking agent/oxirane reaction and rearrangement of the resulting adducts proceeds readily, even in the absence of a catalyst. Ordinarily, deblocking is allowed to occur as it will while the system is being heated to the temperature to be maintained during the first (or only) stage of the curing regime (a total of from 2 to 20 hours at temperatures in the range of 180°-220° C., depending on whether or not a catalyst is employed, for example).

The rate of "deblocking" is largely dependent on melting point and particle size of the blocked isocyanate in the rest of the epoxy system. If the particles are relatively large and high melting, deblocking may not proceed at a useful rate at temperatures as high as 200° C. However, if the particles constitute a fine powder, the rate of interaction between oxiranes and the large surface area of the blocked isocyanate particles may be quite adequate at substantially lower temperatures. If the particles melt and good stirring is maintained, an adequate rate of reaction will usually be established at temperatures of 180°-200° C.

In the one instance in which benzoxazinedione was used (ex situ) to block an aromatic polyisocyanate (methylene diphenyl diisocyanate), the resulting solid was very high melting and was insoluble in D.E.R.-332.

EXAMPLES

The following examples are for purposes of illustration and are not to be construed as limiting the invention in a manner inconsistent with the claims in this patent.

Example 1: Ex situ preparations of blocked isocyanate as 2:1 adduct of 2-benzoxazolone with MDI (ethylene diphenyl diisocyanate or bis(4-isocyanatophenyl)methane)

A. In THF (tetrahydrofuran)

A 250 ml round-bottomed flask, equipped with a mechanical stirrer, thermometer and condenser, was charged with dry THF, 175 ml, and 2-benzoxazolone, 27.0 g, 0.20 mole, and stirred to effect dissolution. Stannous octoate catalyst, 3 drops, was added, followed by methylene diphenyl diisocyanate (MDI), 25.0 g, 0.10 mole. The solution was slowly heated over 30 minutes to reflux, then held 30 minutes additional. The fine slurry that formed was vacuum filtered, washed several times with THF, then dried under vacuum to yield a fine amorphous powder, 45.6 g, 88% of Theory. m.p. was 198°-200° C.

B. In MEK (methylethyl ketone)

A one-liter, round-bottomed flask equipped with a mechanical stirrer, a condenser and a thermocouple controller probe was charged with 2-benzoxazolone, 54 grams, 0.4 g mole and MEK, 350 ml, and the mixture stirred at ambient temperature. To the resulting solution was added 50 grams, 0.4 g equiv., of MDI. Particles of solid begain to precipitate immediately. Three drops of stannous octoate catalyst were added and the mixture heated to 70° C. The resulting reaction was exothermic and produced a very stiff slurry—which was diluted with another 150 ml of MEK and was still rather stiff. After 45 minutes at 70°-80° C., the slurry was cooled and filtered with vacuum. The filtrand was washed twice with 200 ml portions of MEK and dried in a vacuum oven to yield 84.7 grams (81% of theoretical yield) of a fine, amorphous, off-white powder melting at 196°–198° C.

Example 2: Use of blocked isocyanates (1A and 1B) as curing agents for epoxies

A. Adduct 1A, 6.9 grams, 0.08 equivalents of oxirane-reactive groups, was slurried with a liquid epoxide, D.E.R.-332, of the foregoing formula (8), n=~0.15, 17.4 grams, 0.10 equivalents of oxirane and 1 drop of "A-2" catalyst (tetrabutyl phosphonium acetate-HOAc). The mixture was placed in a sample mold, degassed at 100° C. for 30 minutes and cured: 18 hours at 180° C. and 2 hours at 200° C. Test specimens ("dumbbells" or "dog bones") were machined from the clear, cured sample and tested: tensile strength 8000 psi, elongation 4% and modulus 214,000 psi.

Since a catalyst was employed and the isocyanate was aromatic, the foregoing equation (1) applies, with $f_a=1$. That is, the theoretical minimum equivalents of the diisocyanate required for curing the latter mixture are $I=0.1/(2+1)=0.033$ (as compared to $0.08/3=0.027$ equiv. actually used).

B. An attempt was made to cure each of two, low melting, at least trifunctional epoxides with the foregoing 1-B adduct in the presence of 0.1% A-2 catalyst. The adduct was sieved to obtain a powder in which all of the particles had effective diameters of less than 125 microns. The powder was slurried in a mixture of the molten epoxide (D.E.N. ®-438 or "XD-7342"; tris(4-glycidyloxyphenyl)methane) in an amount such as to provide 0.8 equivalent of oxirane-reactive functionality per equivalent of oxirane. Gelling occurred during attempted degassing at 125° C. It was concluded that systems of this type including catalyst are excessively reactive. It is believed, however, that blocking agents of the invention can be employed, in the absence of catalyst, to cure such higher functionality epoxides.

Example 3: In situ preparation and use, as curing agent for D.E.R.-332, of 2:1 adduct of 2-benzoxazolone and MDI A. A quantity of D.E.R.-332 was dried under vacuum at 130° C. A round-bottomed flask equipped with a mechanical stirrer and thermocouple controller probe was charged with dry D.E.R.-332, 71.5 g, 0.411 mole epoxide, and heated to 80° C. 2-Benzoxazolone, 14.8 g, 0.1096 mole was added and stirred until dissolved. MDI, 13.7 g, 0.0548 mole, was added in one portion. An exothermic reaction ensued which carried the reaction temperature to 91° C. in 6 minutes. The reaction mixture turned milky, was held at 80°–90° C. for 60 minutes at which time the mixture was slurry. At ambient temperature the composition was a stiff paste. Overall stoichiometry again was 0.8 equivalent of oxirane-reactive functions per equivalent of oxirane.

B. Two samples of the latter paste, one as made and the other with a trace of A-2 catalyst added, were placed in aluminum dishes and heated in an oven at 200° C. for 15 minutes. The catalyzed sample had cured to a hard, brittle solid but the other sample (when cooled to room temperature) was still very sticky and poorly cured. After standing overnight under $CH_2Cl_2$, the catalyzed sample had swollen but not dissolved. The uncatalyzed sample, after standing overnight as made, had reverted to a paste.

C. A 40-gram portion of the blocked MDI/D.E.R.-332 mixture was degassed under vacuum at 110° C.; 40 mg (0.1% by wt.) of A-2 catalyst was added and the hot mixture transferred to an open casting plate. After further degassing at 130°, the resin was cured 16 hours at 180° C. and 2 hours at 200° C. The resulting castings were clear and amber colored but proved too brittle for preparation of test specimens.

D. To decrease the degree of cross-linking and increase the linearity of the cured polymer, the content of the blocked isocyanate in the system was increased. 30.01 Grams of the same mixture employed in experiment C preceding was mixed with enough more (7.13%) of the blocked isocyanate (prepared ex-situ; Example 1A) to raise the oxirane-reactive group/oxirane equivalent ratio to 1:1. The mixture was heated to 100° C., about 0.1 wt. % of A-1 catalyst (ethyl triphenyl phosphonium acetate.HOAc) was mixed in. The final resin transferred to $3''\times 5''\times \frac{1}{8}''$ open molds, vacuum degassed and cured 16 hours at 180° C., then 2 hours at 200° C. Three replicate test specimens were prepared and tested. The average values found were: tensile strength 7990 psi; elongation 4% and modulus 214,000 psi.

Example 4: Preparation of 2-benzoxazolone-blocked aliphatic diisocyanate and use as curing agent for D.E.R.-332—as such and in admixture with a difunctional secondary alcohol A. A 250 ml., round-bottomed flask was charged with 2-benzoxazolone (27.0 grams, 0.4 equivalents), 100 ml of THF and 3 drops stannous octoate catalyst. With stirring, 16.8 grams (0.2 equiv.) of HMDI (hexamethylene diisocyanate was added. The mixture was refluxed for 2.5 hours and became a slurry of a copious precipitate, which was cooled and filtered to give 31.4 grams (72% of theoretical yield) of an off-white, coarse powder melting at 204°–207° C.

B. 217 mg (0.5 mmoles) of the latter powder was crushed and blended with 348 mg. (2.0 m. equiv.) of D.E.R.-332 and slowly heated. The powder did not dissolve until the temperature reached about 200° C. and reprecipitated when the solution was cooled. However, when the blend was reheated to 200° C. and a drop of A-2 catalyst was added, immediate cross-linking resulted.

Since a catalyst was used, foregoing equation (1) again applies. Since an aliphatic diisocyanate was used, $f_a=0$ and $n=2$. Accordingly, the theoretical minimum equivalents of isocyanate required was:

$$I=0.002/2=1 \text{ milliequivalent.}$$

The millequivalents of isocyanate actually used in the preceding experiment (B) was $2\times 0.5$, i.e., was 1.

C. Another portion of the coarse powder (the blocked isocyanate) was ground to a fine powder and mixed with D.E.R.-332 in the same relative amounts as in (B). About 0.1 wt. % of A-2 catalyst was mixed with the resulting slurry and the mixture then heated. A clear melt formed and then set to a brittle solid.

D. A mixture was prepared from the blocked isocyanate (A; 2.96 grams, 0.0270 equiv. of oxirane-reactive groups and 0.0135 equiv. of hydroxyl-reactive groups), D.E.R.-332 (4.71 grams, 0.0272 equiv. oxirane) and Dow resin 565, the 2:1 adduct of propylene oxide with bisphenol A (2.23 grams, 0.013 equiv. of OH). One drop of A-1 catalyst was mixed in (using a mortar and pestle). The resulting slurry was transferred to open molds and cured 3 hours at 180° C. The material had gelled and was slightly resilient. After being heated another 2 hours (at 200° C.) and allowed to cool slowly to ambient temperature, the resulting specimen blanks were clear and uniform. Test samples were prepared and tested. The averge tensile strength found was 809 psi and the average elongation was 2%.

Example 5: Ex situ preparations of blocked aliphatic and aromatic diisocyanates, using a benzoxazinedione as the blocking agent A. A 250 ml, round-bottomed flask was charged with 3,1-benzoxazine-2,4-dione (6.6 grams, 0.04 g. mole, 0.12 equiv. of latent, oxirane-reactive function), HMDI (3.4 grams, 0.02 g mole, 0.04 g equiv. NCO), 100 ml of THF and 2 drops of stannous octoate catalyst. The resulting solution was stirred, heated to boiling and refluxed 5 hours. On standing and cooling overnight, a gelatinous precipitate had formed in small amount. This was filtered out (with vacuum) and the filtrate poured into 300 ml of water with stirring. A white precipitate formed and was filtered out and dried in a vacuum oven to give 4.12 grams of a white, amorphous powder melting at 222°-224° C.

B. A 250 ml, round-bottomed flask was charged with 3,1-benzoxazine-2,4-dione (6.6 grams, 0.04 mole) and 100 ml THF. The mixture was heated to about 60° C. and stirred until it was a solution. Two drops of stannous octoate and 5 grams (0.02 g moles) of MDI were added and the solution refluxed for 2.5 hours. Again, a small amount of a precipitate was filtered out and the filtrate poured into 300 ml of water with stirring. The resulting precipitate was collected by vacuum filtration and dried in a vacuum oven to give 7.54 grams of white, amorphous powder, which proved to be very high melting (~360° C., with decomposition).

An attempt was made to cure D.E.R.-332 (1.74 grams, 0.01 equiv. of oxirane) with 0.68 gram of the blocked isocyanate powder (calc. 0.01 equiv. of oxirane-reactive functions) in an open aluminum dish on a hot plate. Not all of the powder dissolved and the cooled mixture, although a hard solid, was brittle.

Other benzoxazinediones, aromatic isocyanates and-/or epoxides were not tried.

The blocked isocyanate prepared in experiment A, from HMDI, was not tested as a curing agent but, by reason of its melting point and solubility (and the proven utility of the benzoxazinedione as a curing agent for epoxides) is nevertheless believed usable for the practice of the present invention.

What is claimed is:

1. The compounds of the formula

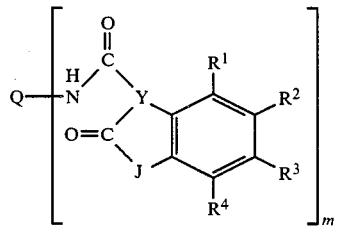

(1)

wherein Q is a mono- or polyvalent, non-interfering radical; independently in each occurrence, Y is an >N— or

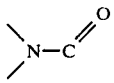

group, J is O or S, each of $R^1$, $R^2$, $R^3$ and $R^4$, is H or a non-interfering substituent, of which any adjacent pair may constitute an alkylene, alkenylene or alkadienylene group of 3 or 4 carbons, and m is 2 or 3.

2. The compounds of claim 1 in which J is O, in each occurrence.

3. The compounds of claim 1 in which each of $R^1$, $R^2$, $R^3$ and $R^4$ is H, in each occurrence.

4. The compounds of claim 1 in which Y is >N—, in each occurrence.

5. The compounds of claim 1 in which m is 2.

6. The compounds of claim 1 in which Q is an m-valent radical which is aliphatic or cycloaliphatic or includes one or more aromatic rings to which the —NH— groups are directly joined.

7. The compounds of claim 6 in which m is 2.

8. The compounds of claim 7 in which, in each occurrence, J is O, each of $R^1$, $R^2$, $R^3$ and $R^4$ is H and Y is >N—.

9. The compounds of claim 8 in which Q is a hexamethylene radical.

10. The compounds of claim 8 in which Q is

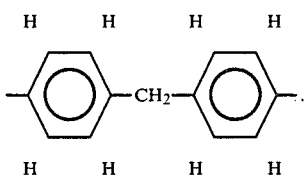

11. A latently curable mono- or polyphase epoxy resin system comprising:
(a) a polyfunctional epoxy resin, and
(b) dispersed throughout the rest of said system or constituting a continuous separate phase in contact therewith and dispersible therein, a blocked isocyanate of the formula

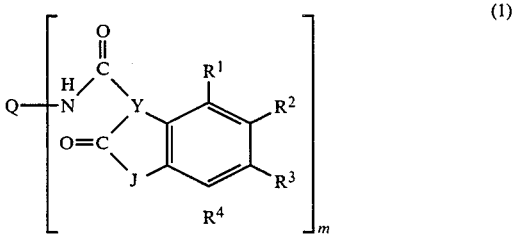

(1)

wherein Q is a mono- or polyvalent, non-interfering radical; independently in each occurrence, Y is an N— or

group, J is O or S, each of $R^1$, $R^2$, $R^3$ and $R^4$, is H or a non-interfering substituent, of which any adjacent pair may constitute an alkylene, alkenylene or alkyldienylene group of 3 or 4 carbons, and m has a value of 2 or 3.

12. A process for preparing a latently curable epoxy resin system, said system comprising a blocked isocyanate which is dispersed throughout the rest of said system or constitutes a continuous, separate phase in contact with and dispersible therein, said blocked isocyanate being a compound of the formula

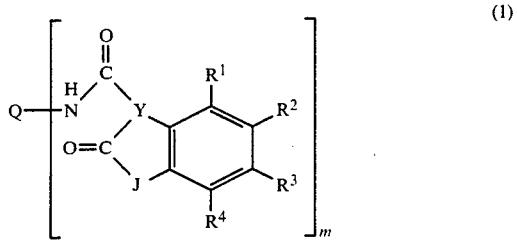

wherein Q is a mono- or polyvalent, non-interfering radical; independently in each occurrence, Y is an >N— or

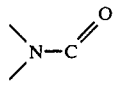

group, J is O or S, each of $R^1$, $R^2$, $R^3$ and $R^4$, is H or a non-interfering substituent, of which any adjacent pair may constitute an alkylene, alkenylene or alkadienylene group of 3 or 4 carbons, and m is 2 or 3, and said process comprising either
(1) reacting an isocyanate of the formula $$Q\text{-}(NCO)_m \qquad (2)$$

with a benzoxazolone or benzoxazinedione of the formula

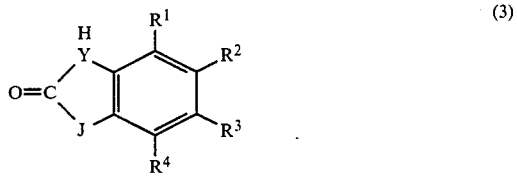

in the presence of said resins, or
(2) carrying out said reaction in the absence of said resin and then bringing together said compound and said resin.

13. The process of claim 12 comprising as an additional step, heating said mixture to a sufficient temperature to cause said compound to interact with said epoxy resin and maintaining said mixture at or above said temperature until said system has been satisfactorily cured.

14. The process of claim 12 in which a catalyst is employed in forming said compound.

15. The process of either of claims 13 and 14 in which a catalyst for the interaction of said compound with said epoxy resin is included in said system.

16. The process of claim 12 in which said compound is formed by reacting the isocyanate and the benzoxazolone or benzoxazinedione as a solution, in tetrahydrofuran or methyl ethyl ketone, which does not include said resin.

17. The process of any of claims 12, 13 and 14 in which, in said compound, Q is an m-valent radical which is aliphatic or cycloaliphatic or includes one or more aromatic rings to which the —NH— groups are directly joined.

18. The process of any of claims 12, 13 and 14 in which, in said compound, in each occurrence, Y is >NH, J is O, each of $R^1$, $R^2$, $R^3$, and $R^4$ is H, m is 2, and Q is a divalent radical which is aliphatic or cycloaliphatic or includes one or more aromatic rings to which the —NH— groups are directly attached.

19. The cured product made by the process of any of claims 12, 13, and 14.

20. The system of claim 11 wherein J is O, in each occurrence.

21. The system of claim 11 wherein each of $R^1$, $R^2$, $R^3$, and $R^4$ is H, in each occurrence.

22. The system of claim 11 in which Q is an m-valent radical which is aliphatic or cycloaliphatic or includes one or more aromatic rings to which the —NH— groups in formula (1) are directly joined.

23. The system of claim 11 in which m is 2.

24. The system of claim 11 in which, in each occurrence, J is O, each of $R^1$, $R^2$, $R^3$, and $R^4$ is H, Y is >N—, and m is 2.

25. The system of claim 11 in which Q is a hexamethylene radical.

26. The system of claim 11 in which Q is

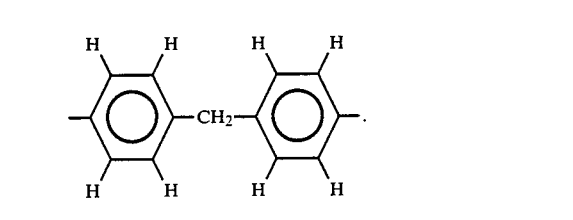

* * * * *

UNITED STATES PATENT AND TRADEMARK OFFICE
CERTIFICATE OF CORRECTION

PATENT NO. : 4,701,512

DATED : October 20, 1987

INVENTOR(S) : Theodore L. Parker

It is certified that error appears in the above-identified patent and that said Letters Patent is hereby corrected as shown below:

Col. 1, line 11, "nd" should be --and--;

Col. 1, line 45, the "M" should be capitalized in the formula "MeOH";

Col. 7, line 4, after the word "They" insert the word --are--;

Col. 7, line 67, "dimethyl-4,4'-diisocyanatodiphenyl" has been misspelled;

Col. 7, line 68, "3,3'-dimethyl-4,4'-diisocyanatodiphenyl" has been misspelled;

Col. 8, line 29, after the word "it" add the word --also--;

Col. 8, line 49, "charged" has been misspelled;

Col. 9, line 12, the "F" in the formula "$O_x=I(n+Fa)$" should be lower case;

Col. 9, line 54, the "F" in the formula "$I(n+0.6Fa)=0.6O_x$" should be lower case;

Col. 10, line 63, "referred" has been misspelled;

UNITED STATES PATENT AND TRADEMARK OFFICE
CERTIFICATE OF CORRECTION

PATENT NO. : 4,701,512

DATED : October 20, 1987

INVENTOR(S) : Theodore L. Parker

It is certified that error appears in the above-identified patent and that said Letters Patent is hereby corrected as shown below:

Col. 10, line 67, delete the word "assuring" and insert therefore the word --assuming--;

Col. 11, line 24, "amino-3,5-dichlorophenol" has been misspelled;

Col. 11, line 29, "$R_2$" should read --$R^2$--;

Col. 11, line 43, "chloroformate" has been misspelled;

Col. 15, line 35, after the word "of" insert the word --a--;

Col. 15, line 68; Col. 16, lines 16 and 26; Col. 17, line 23; and Col. 18, lines 24 and 41, please show the reference ">N" as -- $\gt$N --.

Signed and Sealed this

Thirteenth Day of December, 1988

*Attest:*

DONALD J. QUIGG

*Attesting Officer*      *Commissioner of Patents and Trademarks*